United States Patent [19]

Czyl

[11] 4,098,093
[45] Jul. 4, 1978

[54] UNITARY CAB AIR COOLING SYSTEM FOR LARGE OFF ROAD VEHICLES

[75] Inventor: Joseph L. Czyl, Harvey, Ill.

[73] Assignee: Vapor Corporation, Chicago, Ill.

[21] Appl. No.: 747,704

[22] Filed: Dec. 6, 1976

[51] Int. Cl.$^2$ ............................................. B60H 3/04
[52] U.S. Cl. ........................................ 62/243; 62/244
[58] Field of Search ................ 62/243, 244, 239, 285, 62/291, 290

[56] References Cited

U.S. PATENT DOCUMENTS

| | | | |
|---|---|---|---|
| 2,799,145 | 7/1957 | Jansen | 62/291 |
| 3,156,101 | 11/1964 | McGuffey | 62/243 |
| 3,417,576 | 12/1968 | Stucky | 62/244 |
| 3,719,058 | 3/1973 | Waygood | 62/243 |
| 3,848,428 | 11/1974 | Rieter, Jr. | 62/244 |
| 3,983,715 | 10/1976 | Hair, Jr. et al. | 62/243 |

*Primary Examiner*—Lloyd L. King

*Attorney, Agent, or Firm*—Francis J. Lidd

[57] ABSTRACT

A vehicular air cooling-ventilating system which provides cooled, filtered, and dehumidified air for the operating cab of a large off the road vehicle in a unitary package usually mounted in the cab overhead. Unit utilizes available hydraulic fluid power for all shaft horsepower requirements. A unique compensated drive system provides operation of the pulsating torque compressor load by a hydraulic motor prime mover. The compensated drive system also provides operation in the presence of pulsating hydraulic fluid pressure commonly encountered in the supply of large vehicles. Internal components are protected from contamination by an air operated vent cover. Additionally, the difficult condensate handling problem caused by motion of the vehicle and consequences of condensate loss in the vehicle cab is overcome through the use of a flow metered baffle design in the condensate receiver.

15 Claims, 6 Drawing Figures

UNITARY CAB AIR COOLING SYSTEM FOR LARGE OFF ROAD VEHICLES

BACKGROUND OF THE INVENTION

This invention pertains to air cooling and dehumidifying systems in general, and in particular to a unitary air cooling package utilized in off the road vehicles. Recent developments in earth moving vehicles have resulted in units often having a main propulsion engines above 1000 horsepower. The type of vehicles utilizing these high horsepower drives are very large and in most cases used in environments which are quite hostile to the operator of the vehicle. Consequently, it has become almost mandatory to provide an air cooling system which provides filtered cooled and dehumidified air in order to reduce operator fatigue and to allow improved concentration necessary to operate a vehicle of this size.

Operating cab location remote from the main prime mover presents a substantial problem in providing sufficient energy for operation of the cooling unit since belts or shafts conventional in automotive applications cannot be used. Electrical drives while flexible, incur substantial inefficiencies due to losses in generation and drive motors. Reliability of electric drives is also a problem when employed auxiliary systems on a hydraulic drive vehicle. Therefore, a cooling system eliminating an additional sub-system substantially increases overall vehicle reliability.

It has been found efficient and convenient to utilize available high pressure hydraulic fluid powered by the vehicles prime mover as an energy source. Therefore, it is necessary to operate all auxiliary components from hydraulic power. As stated earlier, the size and design of the vehicles involved requires that any cooling equipment be self contained except for its energy source and mounted directly over the heads of the vehicle operators. Earlier units have utilized electric motors to drive refrigeration compressors and fans needed for cooling, and in particular the compressors involved have in many cases become optimized for electric motor drive. Therefore, when operating this kind of equipment from a hydraulic motor, difficulties have been encountered due to output torque limits, low inertial mass of the hydraulic drive motors, and pulsating pressure in the source of hydraulic power.

Use of hydraulic energy for operation of all components of the air conditioner, as disclosed, provides additional reliability in the case of electrical system failure, allowing continuing or emergency operation of a diesel powered vehicle after loss of an electrical subsystem.

BRIEF DESCRIPTION OF THE INVENTION

The unit disclosed here provides operation of all air handling and refrigerant compressing components from available hydraulic fluid power. The use of a small hydraulic motor capable of delivering necessary shaft power to operate an automotive type refrigeration compressor which presents a shaft load having a highly pulsating characteristic is made possible by coupling the air handling equipment so as to provide effective inertial compensation to the low inertia hydraulic prime mover.

Relatively low cost automotive refrigeration compressors highly suitable for vehicular cab service have been designed and optimized to be driven from a high inertial prime mover, such as an automobile engine. Under these conditions the torque pulsations produced by the compressor were of relatively little significance in the overall system. Electric motor drives, when used with automotive compressors, inherently provide additional transient output torque when loaded with pulsating torque loads. However, when automotive compressors are utilized with a prime mover such as the hydraulic motor, a combination of pulsating torques presented by the compressor and additional shaft torque pulsations of the hydraulic motor caused by pressure fluctuations in the fluid power source would ordinarily preclude the use of a hydraulic motor as a drive for a refrigeration system.

However, as disclosed here, utilizing the integral connection of both blowers, along with the resilient coupling, results in a "tuned" drive system which effectively prevents stalling out of the hydraulic motor and cancel out the inherent load torque pulsations and resultant vibration which would be highly destructive and result in extremely short life of the air conditioning unit.

Condensing air flow and life of the unit is greatly enhanced through the use of a unique air operated vent which provides an advantageous discharge location for the heated condensing air while at the same time provides protection from entry of water, dust, and other contaminents when the unit is inoperative. Operation is entirely automatic and does not require that the vehicle operator open or close vents to place the system in operation.

Control of the evaporator condensate is provided under all conditions of vehicle operation including substantial angular displacements from the horizontal through the use of a novel baffling system in the condensate tray which meters the condensate flow.

Accordingly, it is the object of this invention to provide a unitary air cooling ventilating and filtering system operable from available hydraulic power for use in large off the road vehicles.

It is an additional object of this invention to provide inertially compensated drive system which allows operation of a pulsating torque load from a relatively low inertia hydraulic drive motor.

It is an additional object of this invention to provide a compensated drive system for a refrigeration compressor which essentially eliminates torque pulsations and resultant vibration in a unitary air cooling system.

It is a further object of this invention to provide a unitary vehicular air cooling and dehumidifying system suitable for mounting overheat in a vehicular cab which provides condensate drainage without loss in the vehicle, during operation over terrain involving changes in vehicle attitude.

It is a still further object of this invention to provide a unitary air cooling and dehumidifying system which is operable from a pulsating hydraulic fluid supply.

A further object of the invention is to provide a unitary air cooling, ventilating and filtering system totally operable from hydraulic power without requiring electrical energy of any kind.

BRIEF DESCRIPTIONS OF THE DRAWINGS

DETAILED DESCRIPTION OF A PREFERRED EMBODIMENT OF THE INVENTION

Figure 3:
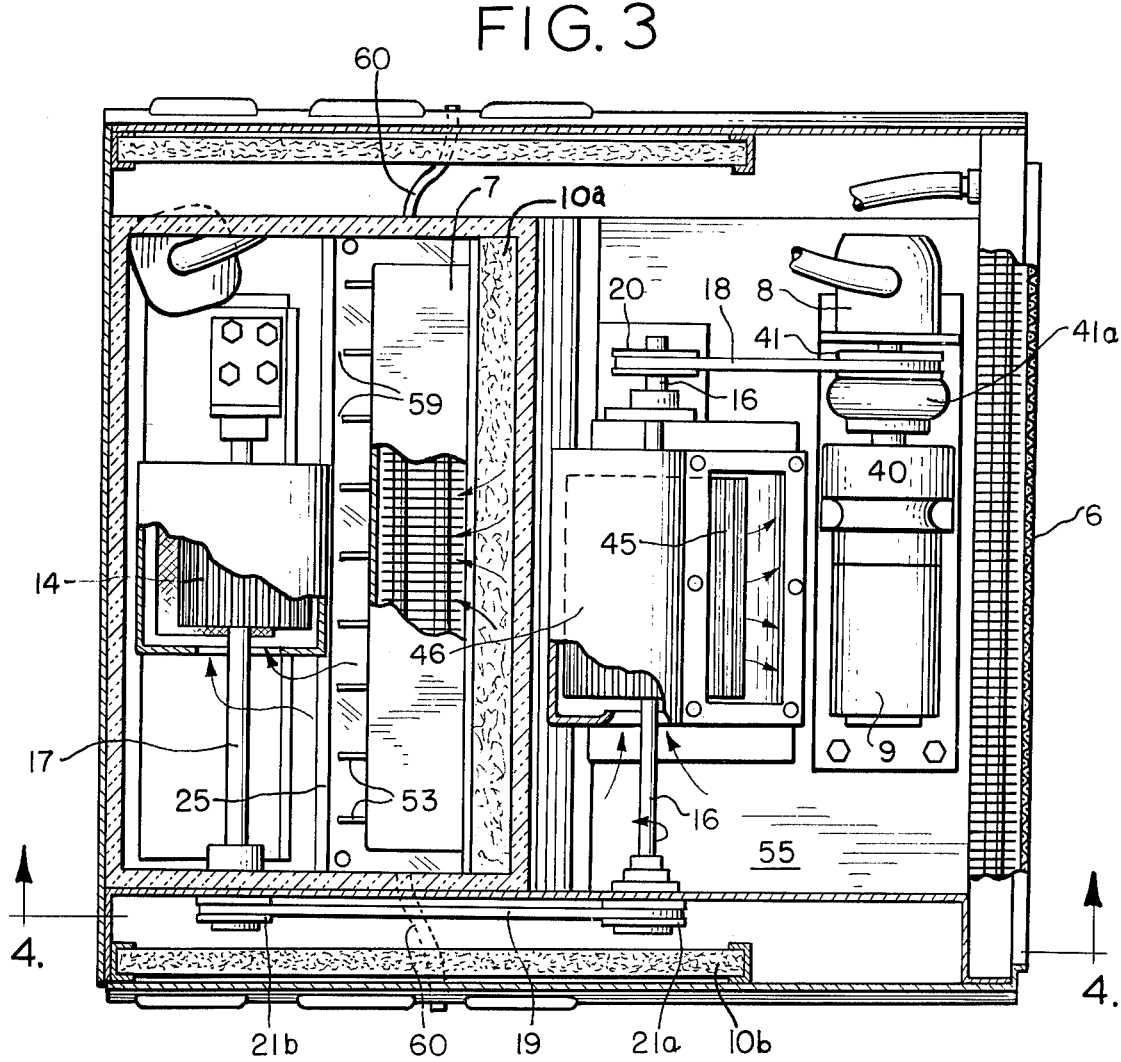
FIG. 3 is a plan view of the unitary cooler with the top removed showing placement of component parts in detail.
Figure 5:
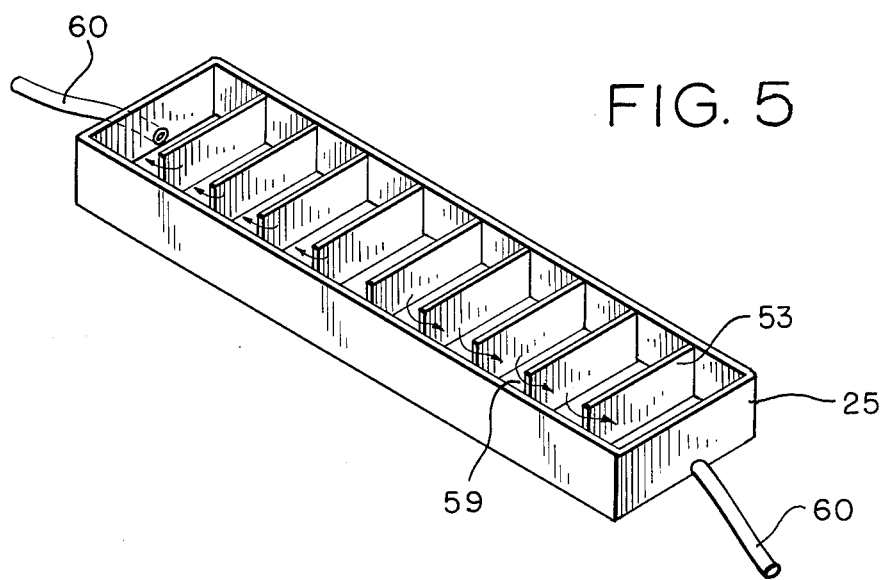
FIG. 5 is a perspective drawing of the novel condensate tray partially shown in FIG. 4.

Referring now to FIG. 3, a hydraulic motor 8 is shown coupled to a refrigeration compressor 9 by means of a resilient coupling assembly 41, 41a, and a clutch 40. Also coupled to the shaft of the hydraulic motor is a condensing air blower 46 operating on a shaft 16. Shaft 16 is a driven thru belt 18, pulley 20, and pulley 41 on hydraulic motor 8. Pulley 21a, on shaft 16, belt 19, and pulley 21b on drive shaft 17 drive the evaporator blower 14. Therefore, both wheels of blowers 14 and 46 are semi-resiliently coupled to the shaft of the hydraulic prime mover No. 8.

While squirrel cage blowers are disclosed in the preferred amendment, it will be appreciated by those skilled in the art that other air handling devices, such as ductflo fans, or centrifugal turbines could be used. A suitable hydraulic prime mover is the M2-45, manufactured by Tyrone Corporation. However, other hydraulic motors of sufficient horsepower and proper size could be used.

Similarly, the resilient coupling disclosed can be the DAYCO type EZ or equivalent. Other alternatives will be recognizable to those skilled in the art.

Figure 1:
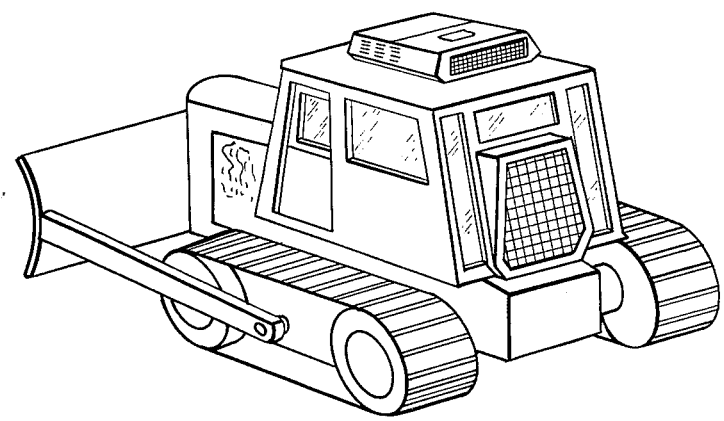
FIG. 1 is a perspective drawing of the unitary air cooler 10 when mounted on a large tracked off the road vehicle.
Figure 2:
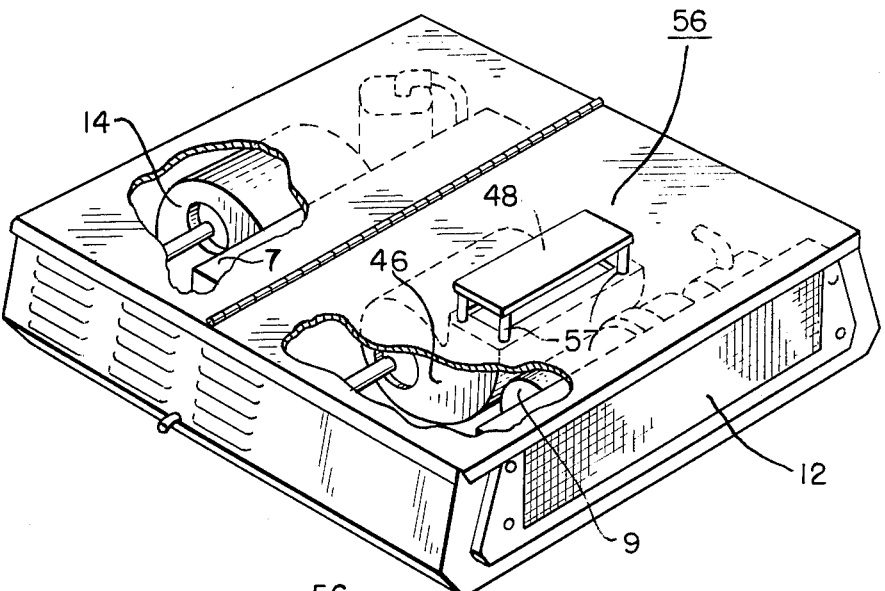
FIG. 2 is a cut away perspective of the unitary air cooling system showing placement of the refrigerant compressor, condensing air, and evaporator air handling equipment.
Figure 4:
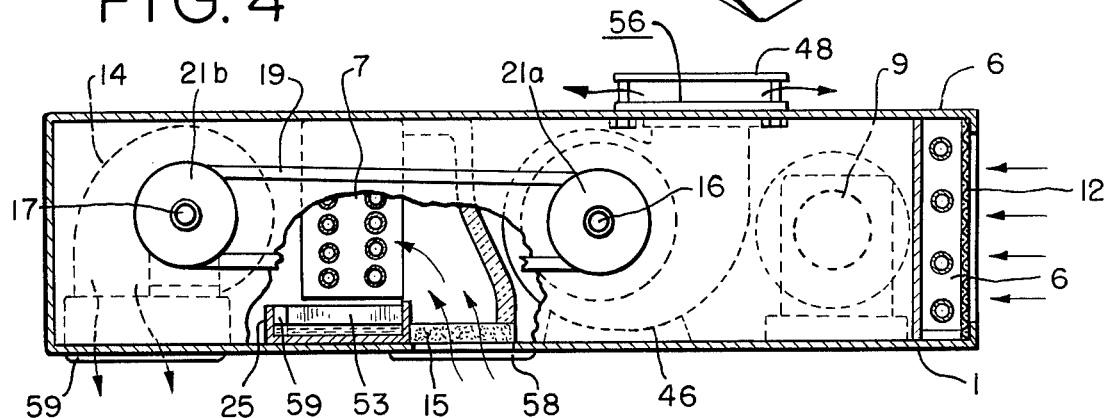
FIG. 4 is a side view of the unitary cooler with a portion removed as indicated in FIG. 3 showing placement of the evaporator and condensing air blowers in phantom and in particular indicating the air operated cover for condensing air outlet.

The evaporator 7, best seen in FIG. 4 and the prime mover, compressor, and blowers, are mounted on a common base No. 1. Located at the lower edge of the evaporator is a condensate tray 25 containing baffles 53 and orificed drains 60. Baffles are positioned underneath the heat exchanger fins of the evaporator and each forms a slot or aperture 55 adjacent to the edge of the tray. This slot provides adequate condensate flow in either direction to allow draining of the tray without interfering with the ability of the baffles to prevent spilling of condensate in the tray or loss of condensate which would be spilled into the compartment. Non-spill condensate removal is achieved although the vehicle undergoes attitude changes which cause substantial deviations of transverse and longitudinal axis from the horizontal.

In operation, hydraulic fluid under pressure nominally in the range of 2000 PSIG is supplied to the motor 8 resulting in rotation of the main drive pulley 41. With the rotating elements interconnected as described above, any fluid pressure pulsations or torque pulsations produced by the compressor requirements are effectively damped out or filtered by the rotational inertia of the squirrel cage blowers 46 and 14, which are coupled semi-resiliently to the drive pulley 41 providing a delay or phase shift of some magnitude. It should be noted that the resilient drive element of the resilient coupling 41a, provides substantially greater phase shifting or delay of the compressor torque pulsations than provided by the semi-resilient coupling to the fans 46, 14. Pulsations in hydraulic motor torque produced by fluid pressure changes from the fluid power source are initially transmitted to the relatively high inertial fans. Under these conditions connection of the inertial loads presented by the wheels of blowers 46 and 14 tend to smooth out the resultant pulsations. The "smoothed" shaft torque pulsations are further delayed and smoothed by resilient coupling 41a, greatly reducing vibration and consequently increasing life operating life of the entire unit.

Both the evaporator heat exchanger 7 and the condensing heat exchanger 6 are of the highly efficient draw through type. The location of the compressor 9 and the prime mover 8 in the condensing compartment 55 adjacent to the condenser air inlet provides inlet air cooling for these components by maintaining a substantial ambient air mass flow across them prior to discharge through the condensing air outlet 56. A unique air operated cover 48 is positioned over condenser air discharge port 56 contained and guided by pins 57. In operation, positive condensing air pressure in the discharge chute of the blower 46 creates force on the underside of the cover or aperture 48 raising it sufficiently to discharge the heated condensing air initially drawn in through the inlet screen and filter 12.

With the system de-energized, the pressure in the chute 46 falls allowing the cover 48 to close the opening 56, essentially sealing the air compartment 55 from ambient rain and dust. This configuration provides a condensing air flow pattern essentially free of re-circulated condenser exhaust air and overcomes many difficulties, the most important being entrance or ambient water to the condensing chamber.

Vehicular compartment air in re-circulation operation is drawn through the compartment or cab air inlet 58 and the compartment air filter 15. The evaporator blower 14 is positioned in the evaporator compartment such that the entire face of the evaporator is operated at somewhat less than atmospheric pressure resulting adequate air flow distribution over the face of the evaporator heat exchanger 7 improving heat exchange efficiency. Filtered and cooled compartment air is then discharged from the evaporator blower outlet 59 into the cab or compartment of the vehicle during operation.

Filters 10a, 10b are located in the inlet air path of the evaporator 7 and air cab ambient inlet or "makeup" port (not shown) located in the housing sidewall behind louevers — so as to communicate outside or ambient air with the cab inlet aperture 58. The makeup port is controlled from inside the cab.

Figure 6:
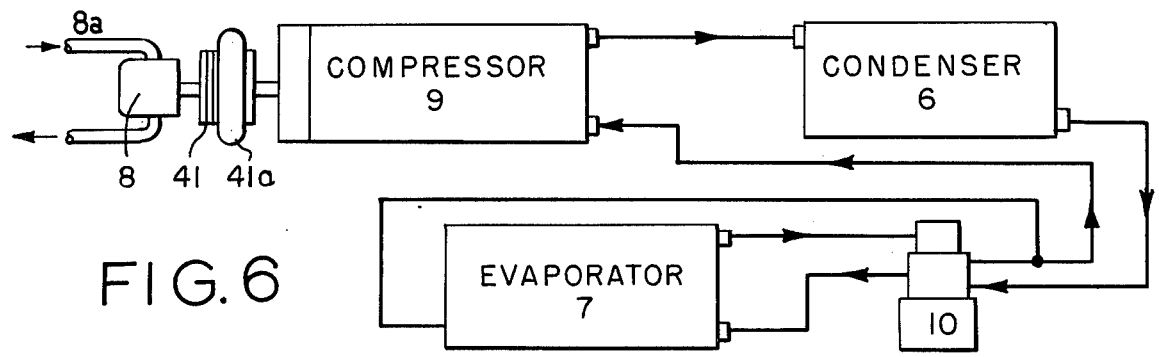
FIG. 6 is a schematic diagram of the refrigerant system.

The refrigeration circuit (ref. FIG. 6) indicates the essential fluid flow paths providing energy inputs to the prime mover/hydraulic motor 8 and refrigerant flow paths between the compressor 9, and heat exchangers 6 and 7. A unit receiver, expansion valve, and suction throttling valve is shown at 10 to complete the disclosure. The refrigeration circuits disclosed are conventional, and therefore the function and operation of components will be well known to those skilled in the art. Control of the cooling system is accomplished by modulating or interrupting flow of hydraulic fluid in supply lines 8a by a remote valve (not shown).

Thus, it is apparent that there has been provided in accordance with the invention, a unitary vehicular air conditioner that fully satisfies the objects and advantages set forth above. While the invention has been described in conjunction with a preferred embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

Therefore, I claim the following:

1. In a unitary air conditioning system for the cab of a large vehicle;
   a hydraulic prime mover having an output shaft;
   a vapor cycle refrigeration compressor, providing a first pulsating torque shaft load;
   means resiliently coupling said prime mover and said compressor transmitting said first pulsation after a first delay;
   means moving ambient air and cab air through said system having a drive shaft, and rotational inertia, providing a second shaft torque pulsation;
   means semi-resiliently coupling said prime mover and air moving means, transmitting said second pulsation after a second delay, said first and second delays unequal in duration, each greater than direct coupling;
   wherein said couplings transmit torque pulsations to said prime mover, displaced in time and said first and second delays provide compensated shaft torque load to said prime mover thereby reducing peak prime mover loading.

2. The cooling system of claim 1 wherein said resilient coupling means has a torsional stiffness of approximately 16,000 inch-pounds per radian.

3. The cooling system of claim 1 wherein said semi-resilient coupling is a "v" belt.

4. The cooling system of claim 1 wherein the prime mover is a rotary hydraulic gear motor.

5. The cooling system of claim 2, wherein the semi-resilient coupling is a "v" belt, and the prime mover is a rotary hydraulic gear motor.

6. In a unitary air cooling system for the cab of a large vehicle.
   a housing having leading and trailing sidewalls and upper and lower surfaces;
   a housing divider disposed parallel to said sidewalls defining first and second chambers;
   a cab air inlet aperture located in said lower surface, adjacent to said housing divider;
   a cab air exhaust aperture in said lower surface adjacent to said trailing sidewall;
   means moving cab air in said chamber, having first outboard drive means, positioned to move air inwardly of said inlet vent and outwardly of said exhaust vent;
   a first heat exchanger in said first chamber, disposed to confine said cab air movement therethrough;
   an aperture in said leading sidewall;
   a second heat exchanger in said second chamber abutting said leading sidewall aperture;
   a hydraulic prime mover mounted in said second chamber adjacent to said second heat exchanger providing drive torque;
   a vapor cycle compressor, in said second chamber, resiliently coupled to said hydraulic prime mover;
   means moving ambient air, having second and third outboard drive means, mounted in said second chamber, said second drive means semi-resiliently coupled to said prime mover and said third drive means semi-resiliently coupled to said first drive means;
   an air outlet aperture in said upper surface;
   a gravity operated cover movably mounted above said aperture for opening and closing said aperture;
   wherein said ambient air moving means moves air inwardly of said leading sidewall aperture through said second chamber in cooling relationship to said compressor and prime mover, and outwardly of said upper surface aperture, said cover opening in the presence of said moving ambient air.

7. The unitary air cooling system of claim 6 wherein;
   said vapor cycle compressor provide a first pulsating torque load;
   and said air moving means provide a second pulsating torque load, and furthermore, provide shaft inertia;
   and said resilient coupling means transmits said first torque pulsations after a first delay; and
   said semi-resilient coupling transmits said second torque pulsations after a second delay;
   wherein said delayed shaft torque pulsations and said shaft inertia compensate said prime mover drive torque.

8. The unitary air cooling system of claim 6 wherein said cab and ambient air moving means are centrifugal blowers.

9. The unitary air cooling system of claim 6 wherein said cab and ambient air moving means are fans.

10. The unitary air cooling system of claim 6 wherein said cab air moving means is a centrifugal blower and said ambient air moving means is a fan.

11. The unitary air cooling system of claim 6 wherein said cab air moving means is a fan and said ambient air moving means is a centrifugal blower.

12. In a unitary air conditioning system for a large vehicle utilizing vapor cycle refrigeration having a reciprocating compressor, squirrel cage blower and a single hydraulic prime mover, the improvement in torque compensated drive system wherein the load torque pulsations of the compressor and blower are transmitted to the prime mover after predetermined delays, each delay substantially greater than a direct metal to metal shaft coupling comprising;
   a shaft coupler intermediate the drive shafts of said prime mover, transmitting compressor torque pulsations to said prime mover after a first delay;
   a "v" belt coupling said prime mover to said blowers transmitting load torque to said prime mover after a second delay;
   wherein said blower provides shaft torque loading sufficiently out of phase with said compressor torque pulsations to reduce peak torque loading on said prime mover.

13. The air conditioning system of claim 12 wherein the hydraulic prime mover utilizes gear rotors.

14. The air conditioning system of claim 12 wherein said first delay is less than said second delay.

15. The air conditioning system of claim 12 wherein said prime mover utilizes reciprocating pistons.

* * * * *